United States Patent
Szafert et al.

(10) Patent No.: US 10,017,906 B2
(45) Date of Patent: Jul. 10, 2018

(54) STABILIZING COMPOSITION TO STABILIZE CLAY LAND AND CLAY SOILS, ITS METHOD OF MANUFACTURE AND STABILIZATION OF CLAY LAND AND CLAY SOILS

(71) Applicant: UNIWERSYTET WROCLAWSKI, Wroclaw (PL)

(72) Inventors: Slawomir Szafert, Wrocllaw (PL); Andrzej Vogt, Wroclaw (PL); Stanislaw Strzelecki, Wroclaw (PL)

(73) Assignee: UNIWERSYTET WROCLAWSKI, Wroclaw (PL)

( * ) Notice: Subject to any disclaimer, the term of this patent is extended or adjusted under 35 U.S.C. 154(b) by 236 days.

(21) Appl. No.: 14/852,245

(22) Filed: Sep. 11, 2015

(65) Prior Publication Data
US 2017/0030031 A1    Feb. 2, 2017

(30) Foreign Application Priority Data
Jul. 29, 2015   (PL) ........................................ 413307

(51) Int. Cl.
| C09K 17/00 | (2006.01) |
| E01C 21/00 | (2006.01) |
| C09K 17/40 | (2006.01) |
| C09K 17/42 | (2006.01) |
| E01C 7/36 | (2006.01) |

(52) U.S. Cl.
CPC .............. E01C 21/00 (2013.01); C09K 17/40 (2013.01); C09K 17/42 (2013.01); E01C 7/36 (2013.01)

(58) Field of Classification Search
None
See application file for complete search history.

(56) References Cited

U.S. PATENT DOCUMENTS

| 3,980,489 | A | * | 9/1976 | Schneider | C09K 17/04 106/274 |
| 4,134,862 | A | * | 1/1979 | Eden | C09K 17/22 205/735 |
| 4,545,820 | A | * | 10/1985 | Mallow | C04B 28/26 106/608 |
| 4,941,924 | A | | 7/1990 | Merritt | |
| 2002/0025382 | A1 | * | 2/2002 | Hawkins | C09K 17/14 427/136 |
| 2005/0111924 | A1 | * | 5/2005 | Maile | C05G 3/04 405/263 |
| 2017/0145282 | A1 | * | 5/2017 | Shumway | C09K 8/035 |

FOREIGN PATENT DOCUMENTS

| CN | 101525541 A | 9/2009 |
| CN | 102977891 A | 3/2013 |
| CN | 104419426 A | 3/2015 |
| EP | 2960231 A1 | 12/2015 |

OTHER PUBLICATIONS www.drocomplex.pl/stablizacjagruntu.html.
www.bzg.pl/node/902 from 2011.

* cited by examiner

*Primary Examiner* — Patricia L Hailey
*Assistant Examiner* — Colette Nguyen
(74) *Attorney, Agent, or Firm* — Andrew W. Chu; Craft Chu PLLC

(57) ABSTRACT

The composition for stabilizing clay-loam soils in the form of a liquid solution includes at least one multifunctional organic compound in the form of derivatives of aromatic or heterocyclic, or alicyclic, or aliphatic compounds, in an amount of 20-40% by weight of the total composition. There is at least one acidic surfactant in an amount of 2-10% by weight of the total composition. There is at least one trivalent metal compound in an amount of 1.0-2.5% by weight of the total composition. There is also sulphuric acid, in an amount of up to 100% by weight of the total composition. The method of preparation and the method of stabilizing clay-loam soils involve the composition.

9 Claims, No Drawings

STABILIZING COMPOSITION TO STABILIZE CLAY LAND AND CLAY SOILS, ITS METHOD OF MANUFACTURE AND STABILIZATION OF CLAY LAND AND CLAY SOILS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The object of the patent is a stabilizing composition being a new generation of ion-exchange stabilizers of clay-loam soils, a method of its preparation and a method of stabilizing clay-loam soils using the stabilizing composition.

2. Description of Related Art Including Information Disclosed Under 37 CFR 1.97 and 37 CFR 1.98.

ROADBOND EN-1 road aggregate is known a preparation by C.S.S. Technology, Inc. from Tolar in Texas 76476 U.S. Pat. No. 4,941,924.

Initially EN-1 preparation was a mixture of citrus oil (e.g. made of lemons) with a solution of sulphuric acid in accordance with U.S. Pat. No. 5,000,789. CSS manufactures a preparation with a modified composition. This is a solution of monosulphonated derivative of an organic aliphatic compound that is a D-limonene, namely of D-limonene sulphonated acid in a concentrated sulphuric acid. D-limonene itself is a simple monoterpene, namely 1-methyl-4-isopropenylcyclohexane-1,8-diene, from which as a result of the reaction of monosulphonation 4-isopropenylcyclohexane-1,8-diene-1-methylenesulphonic acid is achieved. The EN-1 preparation is called an ion-exchange stabilizer of clay-loam soil, i.e. according to the definition of such stabilizers an effective means to stabilize doubtful and expansive (clay, loam) soils in order to implement the layers of improved substrate or road surface substructure, as well as to reconstruct damaged mineral-bituminous surfaces. It is manufactured and distributed in a concentrated state. In the road construction it is used only after dilution with water at a ratio of 1:200 to 1:600. Construction technology using EN-1 lowers the costs of road construction by 30-60%, increases the load-bearing capacity by 40-70%, and by raising the characteristics of durability reduces the cost of road maintenance by 20-60%, compared to standard execution. A preparation manufactured by GAMMA COLOR Sp.z.o.o. is also known. It is used to stabilize roads, squares and industrial construction sites. It is particularly useful with a stabilization of doubtful and expansive soils and stabilization of soils while reinforcing the embankments and construction of forest and agricultural roads, storage yards, car parks etc. The use of this preparation can prevent the replacement of doubtful and expansive soils, turning them into permanent stabilized soil with high load-bearing capacity, $E2 \geq 120$ MPa. UPD preparation is a solution of alkyl-benzene-sulphonic acid (ABS) in sulphuric acid and after mixing with clay soil, durable and strong chemical bonds, including ionic bonds and hydrogen bonds, are formed between the particles of silicates and aluminosilicates contained in the ground. The factor cementing silicates and aluminosilicates is an organic compound with an acidic group that easily reacts with silicates and aluminosilicates, creating a very strong compounds. The resultant stabilized waterproof layer is slightly elastic and is not fractured. Load-bearing capacity and compressive strength are significantly increased. Moreover, the UPD preparation comprises waterproofing additives and the so-called blockers that strengthen the bonds formed, preventing the "ageing" of the resulting stabilization.

Still there is a need of creating new stabilizers in order to obtain a significant improvement of consolidation of the soil colloids by introducing into the soil compounds which are capable of forming more bonds per one molecule with these colloids than in known preparations.

It is clear that the more groups capable of bonding of any type e.g. donor-active (formation of complexes with cations), acid-active groups (salt formation) or capable of forming hydrogen bonds as well as those affecting based on the principle of van der Waals forces the compound has, the greater influence it has on soil colloids, which include mainly silicate and aluminosilicate groups, metal cations, oxides, metal carbonates, silica, sulphides etc., and the like. In addition, the more free metal ions with a valence charge as high as possible in the consolidated soil, the more easily a specific network of coordination interactions favorable for the stabilization of soil domains will be created. This is facilitated by creating an acidic environment in the soil and deliberate introduction of these ions into the soil. Moreover, an additional objective of obtaining new generation ion-exchange stabilizers was to introduce new compounds which would act as molecular reinforcing strings strengthening the consolidated structure of clay-loam soil. Preparations added to the soil should have substances facilitating emulsification and wetting processes, while acting also as the above-mentioned molecular strings.

Finally, optional is adding the preparation concentrate of the invention, hygroscopic water-binding substances (cement, gypsum, etc.) while mixing the soil with a dilute solution of the preparation concentrate of the invention.

SUMMARY OF THE INVENTION

The essence of the invention is a stabilizing composition for stabilizing clay-loam soils in the form of a liquid solution, comprising:
  A) at least one multifunctional organic compound in the form of derivatives of aromatic or heterocyclic, or alicyclic compounds, in an amount of 20-40% by weight of the total composition
  B) at least one acidic surfactant in an amount of 2-10% by weight of the total composition
  C) at least one trivalent metal compound in an amount of 1.0-2.5% by weight of the total composition
  D) sulphuric acid, in an amount of up to 100% by weight of the total composition.

Preferably, multifunctional organic compounds comprise at least two acidic and donor functional groups or functional groups having the capability of reacting with soil colloids with at least van der Waals forces, and preferably forming hydrogen bonds.

Preferably, multifunctional organic compounds comprise at least one sulphonic group, apart from which there are groups selected from: phenolic and/or thiolic and/or carboxylic and/or thiocarboxylic groups, and/or ester (—COOR)

and/or alcohol (—OH) and/or a primary (—CONH$_2$) and/or secondary (—CONHR) amides, and/or nitrosilic (—NO), and/or nitric (—NO$_2$), and/or ketone (C═O) and/or quinone (CO—) groups, and/or primary amines (NHR) and/or secondary amines (—NH$_2$), and/or tertiary amines (—NR$_3$).

Preferably, multifunctional organic compounds are: 1-naphthol-2,4,9-trisulphonic acid or 2-sulpho-terephthalic acid or anthraquinone-2,4-disulphonic acid or 5-sulphosalicylic acid, or 2-naphthol-4-nitro-6-sulphonic acid or mixtures thereof.

Preferably, additionally, multifunctional aliphatic organic compounds comprising oxygen groups in an amount of 2-8% by weight of the total composition are added, preferably aliphatic dicarboxylic acids and/or hydroxy acids.

Preferably, oxalic acid and/or malonic acid and/or succinic acid and/or the tartaric acid and/or citric acid are used as multifunctional aliphatic organic compounds comprising oxygen groups.

Preferably, 4-dodecylbenzenesulphonic acid (ABS) is used as an acidic surfactant.

Preferably, salts comprising ions of trivalent iron (Fe$^{+3}$), or trivalent aluminium (Al$^{+3}$) in the form of sulphates or carbonates, oxides or hydroxides are used as trivalent metal compounds.

Preferably, 65% to 96% sulphuric acid and/or oleum and/or SO$_3$ is used as sulphuric acid.

Another object of the invention is a method of preparing a composition stabilizing clay-loam soils, characterized in that it is performed through direct synthesis of sulphonated multifunctional organic compounds in the form of derivatives of aromatic or heterocyclic, or alicyclic compounds in an amount of 20-40% by weight using sulphonating agents in the form of a concentrated solution of 96% sulphuric acid (H$_2$SO$_4$), and/or oleum (solution of sulphur trioxide SO$_3$ in concentrated sulphuric acid), and/or sulphur trioxide SO$_3$ and then adding other ingredients to this solution, in the form of: acidic surfactants in an amount of 2-10% by weight, trivalent metal compounds in an amount of 1.0-2.5% by weight, wherein the ingredients are subjected to intensive mixing to obtain a homogeneous liquid mixture.

Preferably, multifunctional chain aliphatic compounds with oxygen-containing substituents are optionally added to the solution of sulphonated multifunctional organic compounds in the form of derivatives of aromatic or heterocyclic, or alicyclic compounds, in sulphuric acid along with acidic surfactants and trivalent metal compounds.

Preferably, multifunctional organic compounds comprise at least one sulphonic group, apart from which there are groups selected from: phenolic and/or thiolic and/or carboxylic and/or thiocarboxylic groups, and/or ester (—COOR) and/or alcohol (—OH) and/or a primary (—CONH$_2$) and/or secondary (—CONHR) amides, and/or nitrosilic (—NO), and/or nitric (NO$_2$), and/or ketone (C═O) and/or quinone (CO—) groups, and/or primary amines (NHR) and/or secondary amines (—NH$_2$), and/or tertiary amines (—NR$_3$).

Preferably, multifunctional organic compounds are: 1-naphthol-2,4,9-trisulphonic acid or 2-sulpho-terephthalic acid or anthraquinone-2,4-disulphonic acid or 5-sulphosalicylic acid, or 2-naphthol-4-nitro-6-sulphonic acid or mixtures thereof.

Preferably, additionally, multifunctional aliphatic organic compounds comprising oxygen groups in an amount of 2-8% by weight of the total composition are added, preferably aliphatic dicarboxylic acids and/or hydroxy acids.

Preferably, oxalic acid and/or malonic acid and/or succinic acid and/or tartaric acid and/or citric acid are used as multifunctional aliphatic organic compounds comprising oxygen groups.

Preferably, 4-dodecylbenzenesulphonic acid (ABS) is used as an acidic surfactant.

Preferably, salts comprising ions of trivalent iron (Fe$^{+3}$), or trivalent aluminium (Al$^{+3}$) in the form of sulphates or carbonates, oxides or hydroxides are used as trivalent metal compounds.

Preferably, sulphuric acid is used as a solution of concentration of 65% to 96% of sulphuric acid in water and/or oleum.

Preferably, the stage of sulphonating multifunctional aromatic or heterocyclic, or alicyclic compounds using 96% sulphuric acid at a temperature of 120-125° C. for at least 1 hour, whereas using oleum process temperature is 85-95° C.; trivalent metal compounds are added to the mixture of sulphonated multifunctional aromatic or heterocyclic, or alicyclic compounds, in sulphuric acid at a temperature of 50-60° C.

Another object of the invention is a method of stabilizing clay-loam soils, characterized in that it comprises the following stages:
a. preparing a dilute solution of the stabilizing composition in a ratio of 1:200,
b. preparing the site for the stabilization process by removing the top layer of land from 5 to 30 cm and leveling the surface,
c. rupturing, crushing and scarifying the soil structure at the depth of 15 to 40 cm,
d. introducing the solution of the stabilizing composition prepared in stage a into the soil.
e. leveling and compacting stabilized soil.

Preferably, after conducting stage b) covering the exposed land with a layer of cement or cement mixes from 2 to 4% by weight of hardened ground is additionally carried out.

Preferably, rupturing, crushing and scarifying the soil structure at the depth of 15 to 40 cm is carried out using a tiller.

Preferably, introducing the solution of the stabilizing composition into the soil is carried out by pouring it at the surface of the consolidated soil or by pressure injection.

Preferably, 1 l of concentrated stabilizing composition is used to stabilize 6.5 m$^3$ of clay-loam soil.

Using the composition of the invention and the soil stabilization method has many benefits, for example it allows the use of native soil as the only layer forming a foundation for asphalt concrete surfaces, paver, or as an inherent ground road surface able to bear road transport load. It significantly reinforces (ME$_2$>120 MPa) weak soils as the subgrades, and reduces the swelling of cohesive and expansive (clay, loam) soils below 0.5% and gives them the features of sedimentary rocks. When stabilizing soils with cement it reduces its consumption down to 3% by weight, which prevents shrinkage and cracking. It significantly reduces capillary rise of water, thereby obtaining the required hardiness of stabilized soil. It helps to reduce asphalt concrete pavement to one 4-cm layer, without lowering the load-bearing capacity, quality and durability of the road. It allows cold in-place recycling of asphalt concrete surface with a part of the foundation, without any additional asphalt compounds, while increasing its quality and durability. It reduces time and cost of execution of roadworks up to 70%. Preventing the formation of ruts, ripples and potholes, it prolongs the use of roads and reduces the costs of road maintenance by 60-80%.

As an ecological agent it neutralizes petroleum, oil and gasoline soil pollution, forming a material highly resistant to penetration by water or other liquids. A solution of the composition according to the invention resulting from dilution of the composition with water at a volume ratio of 1:200 is used for substrate stabilization. The consumption of the stabilizing composition is 1 liter—per 6.5 m$^3$ of soil. It means that approx. 0.16 liters of composition is used for ion-exchange stabilization of 1 m$^3$ of soil. In the case of a layer thickness of 25 cm of subsoil, dirt road, old asphalt concrete surface recycling—the consumption of the stabilizing composition for 1 m$^2$ is approx. 0.04 liter, i.e. for 1.0 km of a road with a width of 6.0 m approx. 240 liters of the composition have to be used.

The value of static secondary deformation modulus $E_{v2}$ far exceeding the value of 120 Mp is achieved, an average of 250 Mp, and even >400 Mp, which provides load-bearing capacity of the structure for heavy traffic.

Modern road equipment stabilizes the land with an area of 2000-3000 m$^2$/day. Agricultural equipment such as a tiller, disc harrow, sprayers and rollers can also be used for stabilization.

Before the commencement of works, the soil has to be sampled and its suitability for stabilization should be examined in specialized road laboratories.

BRIEF DESCRIPTION OF THE DRAWINGS

None.

DETAILED DESCRIPTION OF THE DRAWINGS

The composition according to the invention represents a new generation of ion-exchange stabilizers of clay-loam soils. It is a liquid solution concentrate of organic multifunctional aromatic, heterocyclic, alicyclic and aliphatic acidic surfactants, trivalent metal compounds, in concentrated sulphuric acid.

Multifunctional compounds have a spatial structure which enables formation of bonds and interactions with the soil structures in a manner approximately spatially symmetrical around these compounds. This allows a strong symmetrizing of these interactions, which results in regular planar and even spatial lattice structures of type 2D and 3D, respectively. Given the economic aspects, multifunctional derivatives of the cheapest and easily accessible aromatic, heterocyclic and alicyclic hydrocarbons are used, which include benzene, naphthalene, anthracene, phenanthrene, pyridine, triazine, cyclohexane, cyclopropane, or some of their quinone derivatives, e.g. of naphthoquinone, anthraquinone and the like. Aliphatic chain hydrocarbons include mostly multifunctional derivatives from $C_3$ to $C_6$. Multifunctional compounds should contain at least two, preferably more than two functional both acidic and σ—donor groups. Most preferred is the existence of a sulphonic group, apart from which there may be present such substituents as phenolic, thiolic, carboxylic or thiocarboxylic groups. They may also contain other functional groups, apart from sulphonic group/groups, substituents of much less significant properties or even a lack of acid and σ—donor properties. However, they must have the ability for interactions with soil colloids with at least van der Waals forces, and it would be very preferable if they formed hydrogen bonds similarly to the above-mentioned groups (from sulphotic to thiocarboxylic), i.e. for example ester —COOR, alcohol —OH groups, primary and secondary amides (—CONH$_2$, —CONHR), nitrosilic —NO, nitric —NO$_2$, ketone, and/or quinone CO— groups, and even primary, secondary and tertiary amines (—NH$_2$, —NHR, —NR$_3$), which are definitely bases, however, in the acidic medium of such an ion-exchange preparation, these groups have a fully dissociated salts which can interact with the compounds forming clay soil and the like.

In light of the foregoing, exemplary compounds may include for example derivatives of naphthalene, benzene, pyridine, anthracene with one, two or three sulphonic groups and one phenolic group or two carboxylic and one sulphonic group and the like.

Exemplary compounds of this type include:
1-naphthol-2,4,9-trisulphonic acid
2-sulpho-terephthalic acid
anthraquinone-2,4-disulphonic acid
5-sulphosalicylic acid
2-naphthol-4-nitro-6-sulphonic acid Moreover, very preferable from the point of view of the mechanism of consolidating soil colloids is introducing additional consolidating agent into the soil, in a similar manner as the compounds described above, but producing lattice 2D and 3D structures of other geometrical parameters, and other inter-atomic distances.

This allows to form a second lattice further bringing soil domains closer to each other, thereby increasing the effect of consolidation of the soil.

The factor differentiating both lattices is the frame structure of organic compounds, to a lesser extent, the type of substituent.

Additionally, multisubstituted aliphatic compounds, preferably with substituents containing oxygen, and most preferably derived from straight and branched aliphatic chain hydrocarbons, mainly structured from $C_3$ to $C_6$ are fed into the composition stabilizing clay-loam soils.

Examples of such ingredients are e.g.:
aliphatic dicarboxylic acids (oxalic acid, malonic acid or succinic acid etc.), or hydroxy acids such as tartaric acid or citric acid.

These ingredients create a new quality of interactions with soil domains at the molecular level.

The second ingredient of the stabilizing composition are acidic surfactants, on the one hand they facilitate the penetration of the stabilizer solution into the capillary structure of the soil, facilitate the wetting of water-insoluble soil domains and introduce one additional group capable of forming ionic, hydrogen and even coordination bonds. On the other hand, due to long linear molecular structure of the surfactant with the negative charge at the end of it, they form additional bracing structures of the soil similar to reinforcing bars in reinforced concrete. An exemplary compound of this type may be 4-dodecylbenzenesulphonic acid (ABS).

The preparations include also metal cations having a positive charge as high as possible, and therefore the trivalent iron ions ($Fe^{+3}$), trivalent aluminium ($Al^{+3}$) and the like, at the same time generating stable donor-acceptor bonds with donor groups of the above-mentioned organic ligands.

It is preferred to add sulphates of these metals because in the case of chlorides and nitrates a rapid release during dissolution of hydrogen chloride or nitric acid can be expected, which is not preferred from the environmental point of view. It is preferred to add these metals as their oxides, hydroxides, carbonates. All of the above-mentioned compounds (including rust) rapidly react with sulphuric acid giving soluble sulphates.

All ingredients of the stabilizing composition are dissolved in concentrated sulphuric acid (65-96%) which upon dilution (typically in the ratio of 1:200), makes the soil slightly acidic when in use, which favors the process of soil consolidation due to the formation of free metal ions, also those added to the soil together with the stabilizing composition resulting from acid hydrolysis of soil colloids.

An important factor affecting the final quality of the composition according to the invention is optionally adding, during the soil hardening process, small amounts (no more than 2-4% by weight) of a substance stably binding the water, particularly when the stabilized soil is soaked with it.

It is preferred to use cement or gypsum.

A stabilizing composition according to the invention is obtained by direct synthesis of sulphonated aromatic, alicyclic or heterocyclic compounds using three sulphonating factors: concentrated 96% sulphuric acid $H_2SO_4$, oleum (solution of sulphur trioxide $SO_3$ in concentrated sulphuric acid), sulphur trioxide $SO_3$ and then adding other ingredients, such as acid surfactants, metal compounds (preferably trivalent), whose ions, as central ions, form polymeric complexes with sulpho derivatives and multifunctional aliphatic chain compounds with an oxygen-containing substituents, to these solutions.

In the case of using concentrated 96% sulphuric acid $H_2SO_4$, for sulphonation processes of organic substrates the concentration of this acid after the reaction is always lower than the initial acid because of the occurrence of water as one of the reaction products. Usually, in those cases, the concentration of sulphuric acid $H_2SO_4$ in the resultant preparations does not exceed 80%.

When oleum is used, the concentration of sulphuric acid $H_2SO_4$ in the resultant preparations remains unchanged for any amount of water occurring in the sulphonation reaction is immediately consumed by sulphur trioxide $SO_3$ dissolved in acid, leading to the formation of $H_2SO_4$.

A stabilizing composition according to the invention is also obtained by dissolving ready-made, commercially available organic sulpho derivatives and other ingredients of the preparations, such as acidic surfactants and metal salts (preferably trivalent) in concentrated sulphuric acid $H_2SO_4$.

The invention has been described in the embodiments.

Example 1 the Content of a Stabilizing Composition

100 $dm^3$ of concentrated, 96% sulphuric acid (VI), $H_2SO_4$, with a density of 1.86 $g/cm^3$,
20 kg of β-naphthol ($M_W$=144 g)
a saturated solution of a mixture:
of aluminium (III) sulphate (IV) $Al_2(SO_4)_3$ ($M_W$=342 $g \cdot mol^{-1}$) containing from 3.56 kg to 4.75 kg and
of iron (III) sulphate (VI) $Fe_2(SO_4)_3$ ($M_W$=400 $g \cdot mol^{-1}$) from 4.2 kg to 5.6 kg
in concentrated, 96% sulphuric acid (VI) $H_2SO_4$.
citric acid 12 kg
acidic surfactant—ABS, 4-dodecylbenzenesulphonic acid in amounts up to 12 kg Example 2 the Content of a Stabilizing Composition 100 $dm^3$ of concentrated, 96% sulphuric acid (VI), $H_2SO_4$, with a density of 1.86 $g/cm^3$,
20 kg of β-naphthol ($M_W$=144 g)
a saturated solution of a mixture:
of aluminium (III) sulphate (VI) $Al_2(SO_4)_3 \cdot 18H_2O/$ ($M_W$=666 $g \cdot mol^{-1}$) containing from 6.94 kg to 9.25 kg and
of iron (III) sulphate (VI) $Fe_2(SO_4)_3$ ($M_W$=400 $g \cdot mol^{-1}$) from 4.2 kg to 5.6 kg
in concentrated, 96% sulphuric acid (VI) $H_2SO_4$.
citric acid 12 kg
acidic surfactant—ABS, i.e. 4-dodecylbenzenesulphonic acid in amounts up to 12 kg Example 3 a Method of Preparing a Composition According to the Invention Stage I 100 $dm^3$ of concentrated, 96% sulphuric acid (VI) $H_2SO_4$ with a density of 1.86 $g/cm^3$ is put into the reactor with a capacity of 250 $dm^3$ and then 20 kg of β-naphthol ($M_W$=144 g) is slowly added.

After pouring the organic reactant into the reactor the temperature of the reaction mixture is brought to 120-125° C. by vigorous stirring and then this temperature is maintained for 1 hour.

Stage II

After turning off the heating, and lowering the temperature of post-reaction mixture to 50-60° C. a portion of a saturated solution of a mixture is fed, from 6.94 kg to 9.25 kg of aluminium (III) sulphate (VI) $Al_2(SO_4)_3 \cdot 18H_2O/$ ($M_W$=666 $g \cdot mol^{-1}$) and from 4.2 kg to 5.6 kg of iron (III) sulphate (VI) $Fe_2(SO4)_3$ ($M_W$=400 $g \cdot mol^{-1}$) in concentrated, 96% sulphuric acid (VI) $H_2SO_4$.

The amount of free metal ions fed should not exceed 15%-20% of the molar amount of aromatic compounds forming chelating ligands.

The rest of ions should come from the soil as a result of acid hydrolysis of its colloids.

The solution of $Al^{+3}$ and $Fe^{+3}$ ions in concentrated, 96% $H_2SO_4$ may also be prepared using not ready-made sulphates (VI) of these metals, but the reaction product of this acid with oxides, hydroxides or carbonates (in this case only iron).

This can be done in a separate reactor (preferably using the appropriate oxides—in the case of iron—rust, and scale to a larger extent) or directly in the reactor, wherein the sulphonation process is carried out, by introducing these oxides or in the case of iron rust or scale into it.

In this case, however, it is necessary to use correspondingly higher (up to 20%) amount of concentrated sulphuric acid at the beginning of the synthesis.

When the process of dissolution of oxides is carried out in parallel with the sulphonation processes, or if the solution of metal cations in sulphuric acid is added at the beginning of the described reaction of sulphonating aromatic hydrocarbon derivatives, then the following catalytic action of the cations in the process takes place.

Formed sulpho derivatives or those being formed along with phenolic groups, after the appearance of metal cations in the reaction liquid form complexes with them.

These complexes, especially in the case of $Fe^{+3}$ cations, are stable in slightly acidic environment and very stable in neutral and alkaline environment, intensely coloring the solution, mainly with shades of violet (aluminium complexes are much less stable, even in an neutral environment).

Stage III

The next step, after adding metal ions is introducing oxygen chain aliphatic compounds, e.g. 12 kg of citric acid into the post-reaction solution. Citric acid is dissolved in the post-reaction solution under vigorous stirring for 10 minutes.

Stage IV

In the last stage, a portion of acidic surfactant, in this case ABS, i.e. 4-dodecylbenzenesulphonic acid in amounts up to 12 kg, meaning 5% by weight of the total preparation, is fed into the reactor and subjected to intensive stirring.

A stabilizing composition is obtained in the form of a liquid concentrate representing 100% of substrates used.

Example 4 a Method of Preparing a Composition According to the Invention 100 dm$^3$ of concentrated oleum, i.e. solution of sulphur trioxide in concentrated sulphuric acid (VI) $H_2SO_4$ (density of oleum 1.86 g/cm$^3$) is put into the reactor with a capacity of 250 dm$^3$ and then 20 kg of β-naphthol ($M_W$=144 g) is slowly added, while stirring.

After pouring the organic reactant into the reactor, the heater is turned on and the temperature of the reaction mixture is brought to 85-95° C. by vigorous stirring, wherein a portion of the heat required to heat the mixture comes from the exothermic sulphonation process of β-naphthol.

The above-mentioned temperature is maintained for 1 hour.

When after turning off the heating, the temperature of post-reaction mixture drops to 50-60° C. a portion of a saturated solution of a mixture is fed, from 6.94 kg to 9.25 kg of aluminium (III) sulphate (VI) $Al_2(SO_4)_3.18H_2O$/ ($M_W$=666 g·mol$^{-1}$) or preferably from 3.56 kg to 4.75 kg of of aluminium (III) sulphate (VI) in an anhydrous form $Al_2(SO_4)_3$ ($M_W$=342 g·mol$^{-1}$) and from 4.2 kg to 5.6 kg of iron (III) sulphate (VI) $Fe_2(SO_4)_3$ ($M_W$=400 gmol$^{-1}$) in concentrated, 96% sulphuric acid (VI) $H_2SO_4$.

In the last stage of preparing the composition stabilizing clay-loam soils, a portion of acidic surfactant, in this case also ABS, i.e. 4-dodecylbenzenesulphonic acid, in an amount of 5% by weight of the total preparation, which is 12 kg, is fed into the reactor. If oleum is used in the reaction of sulphonating aromatic derivatives, no aliphatic carboxylic, hydroxylic or other derivatives of oxygen aliphatic hydrocarbons are added, due to the presence of 100% sulphuric acid in the resultant product, which could not only easily decarboxylate those compounds but could dehydrate the —OH groups, which could even lead to charring of such compounds.

Example 5

100 dm$^3$ of concentrated, 96% sulphuric acid (VI) $H_2SO_4$ with a density of 1.86 g/cm$^3$ is put into the reactor with a capacity of 250 dm$^3$ and then 10 kg of β-naphthol ($M_W$=144 g) and 10 kg of salicylic acid ($M_W$=148 g) is slowly added, while stirring.

After pouring the organic reactant into the reactor it is heated and the temperature of the reaction mixture is brought to 120-125° C. by vigorous stirring and then this temperature is maintained for 1 hour.

When, after turning off the heating, the temperature of post-reaction mixture drops to 50° C. a weighed portion of 6.94 kg of aluminium (III) sulphate (VI) $Al_2(SO_4)_3.18H_2O$/ ($M_W$=666 gmol$^{-1}$) and vigorously stirred until the salt is completely dissolved. The solution of $Al^{+3}$ ions in concentrated 96% $H_2SO_4$ may also be prepared using the reaction product of this acid with the oxide, hydroxide. This can be done in advance in a separate reactor or in the same reactor using in the beginning a suitable excess of 96% $H_2SO_4$. The next step, after adding metal ions is introducing oxygen chain aliphatic compounds, in this case 5 kg of citric acid and 4 kg of oxalic acid, giving a total of 3.75% by weight of the preparation, into the post-reaction solution.

Then, the procedure is as described in the previous examples. In the last stage, a portion of acidic surfactant, in this case ABS, i.e. 4-dodecylbenzenesulphonic acid in an amount of 10 kg, meaning 4% by weight of the total preparation, is fed into the reactor. A stabilizing composition is obtained in the form of a liquid concentrate representing 100% of substrates used.

Example 6

100 dm$^3$ of concentrated, 70% sulphuric acid (VI) $H_2SO_4$ with a density of 1.61 g/cm$^3$ is put into the reactor with a capacity of 250 dm$^3$ and then 30 kg of 1-hydroxy-2,4-benzenedisulphonic acid is slowly poured.

The mixture is heated to 50-60° C. with vigorous stirring until complete dissolution of the sulphonic acid.

Then, after turning off the heating, a weighed portion of 6.94 kg of aluminium (III) sulphate (VI) $Al_2(SO_4)_3.18H_2O$ ($M_W$=666 gmol$^{-1}$) is fed and vigorously stirred until the salt is completely dissolved. The solution of $Al^{+3}$ ions in concentrated 96% $H_2SO_4$ may also be prepared as already described in Example 3. The next step, after adding aluminium ions (III) is introducing oxygen chain aliphatic compounds, in this case 4 kg of citric acid and 2 kg of triethylene glycol, giving a total of 3% by weight of the preparation, into the post-reaction solution. Triethylene glycol is fed into the reactor and dissolved in the resulting solution, with stirring for 10 minutes. At the end of the entire process of preparing the composition stabilizing clay-loam soils, a portion of acidic surfactant, in this case ABS, i.e. 4-dodecylbenzenesulphonic acid in an amount of 10 kg, meaning 4.9% by weight of the total preparation, is fed into the reactor. A stabilizing composition is obtained in the form of a liquid concentrate representing 100% of substrates used.

Example 7 a Method of Stabilizing Clay-Loam Soils preparing a diluted solution of the stabilizing composition in a ratio of 1:200, i.e. 1 liter of composition is poured into 200 l of water (a barrel), site preparation for the stabilization process by removing the top layer of land (humus), i.e. the removal of humus to the level of clay-loam (expansive), cohesive soils, etc. usually it is 5-30 cm or a previous, worn surfacing e.g. asphalt, old pavement etc. is removed and then preliminary leveling of the ground is carried out using e.g. a grader, if necessary, covering the exposed land with a layer of cement or cement mixes e.g. silment through, for example agricultural spreader or other equipment, not to exceed 2 to 4% by weight of hardened ground, placing a tiller, with a counterpoint of suitable length, depending on the purpose of stabilization; e.g. if it is a parking lot that counterpoints must be 20 cm long, country road—25 to 30 cm, and a motorway >35 cm. The said equipment ruptures, crashes and scarifies the soil structures, introducing the solution of the composition prepared in stage a. This can be done e.g. by pouring it behind the operating tiller or by pressure injection of the composition by special nozzles located in the counterpoints of the tiller, improving the agitation of the solution with the soil and optionally the cement.

mixing this cement with the soil forming a uniform solid mass also using the tiller.

introduction of the road graders onto the stabilized area, after which the stabilized soil is subject to crushing by rollers (which may be of various types, from vibratory to ordinary static ones—metal or rubber etc. on the other side).

After one day and up to 30 hours, heavy construction equipment can enter such a stabilized area, or if necessary top layers can be placed for roads, car parks, airports. If it is not necessary, it is recommended to leave the hardened ground, prepared according to the above-described technology, for at least 7 days, preferably 21 days (in case of motorways), protecting the land against torrential rain (foil etc.). A solution of the stabilizing composition resulting from dilution of the composition with water at a volume ratio of 1:200 is used for substrate stabilization. The consumption of the stabilizing composition is 1 liter—per 6.5 $m^3$ of soil. It means that approx. 0.16 liters of composition is used for ion-exchange stabilization of 1 $m^3$ of soil. In the case of a layer thickness of 25 cm of subsoil, dirt road, old asphalt-concrete surface recycling—consumption of the stabilizing composition for 1 $m^2$ is approx. 0.04 liter, i.e. for 1.0 km of the road with a width of 6.0 m-approx. 240 liters of the composition have to be used. The value of static secondary deformation modulus $E_{v2}$=250 Mp is achieved, which provides load-bearing capacity of the structure for heavy traffic.

Modern road equipment stabilizes the land with an area of 2000-3000 $m^2$/day. Agricultural equipment such as a tiller, disc harrow, sprayers and rollers can also be used for stabilization.

Before the commencement of works, soil has to be sampled and its suitability for stabilization should be examined in specialized road laboratories.

Example 8 Compaction Test Using a Deformation Modulus

In order to verify the quality of performed soil stabilisation compaction test using a deformation modulus is conducted, which is described below.

Sculpted foundation layer should be kept for the time necessary to allow the occurrence of chemical reactions induced by a curing agent. This time is determined by the contractor depending on the ambient temperature. Tests are carried out 3 to 7 days after performing the foundation. Compaction is measured by determining a deformation modulus. Compaction of the foundation layer is tested using VSS plate with a diameter of 30 cm according to BN-64/8931-02. After calculating E deformation modulus unit load range from 0.15 to 0.25 MPa should be adopted, bringing the final loads on the foundation layer to 0.45 MPa. It is assumed that the material of the foundation is sufficiently concentrated if the following two conditions are met, regardless of the type of traffic:

$E_2/E_1 \leq 2.2$            Condition 1:

$E_1$—deformation modulus at the first loading in this range in MPa, $E_2$ deformation modulus at the second loading in this range in MPa, $E_2 \geq 100$ MPa for improved subsoil, $E_2 \geq 120$ MPa for auxiliary foundation.     Condition 2:

The use of stabilizing composition is the best solution of fast, economical and effective performance of tasks in the construction and renovation of roads, squares, car parks, airports, bike paths, access roads to forests and agricultural lands.

After removing the humus layer and performing the grading, the entire construction site is stabilized at an optimal level.

25-cm thick soil layer stabilized with 2-3% cement and the composition of the invention forms a hard surface which allows i.e. avoiding the mud at the construction site, free movement of equipment without temporary roads, performing local or linear excavations mostly without formwork, reducing traditional road layers or those under the floors of cubic facilities, avoiding replacing expansive soil with other material.

Stabilizing composition is widely used.

Dirt roads constructed in the form of stabilized 25÷30 cm layer constitute a stable surface in comparison with the existing slag and breakstone roads and do not deviate from the durability of typical asphalt roads. they do not soften at high temperatures and have no effect of level fractures. Their load-bearing capacity meets the requirements of medium road transport. They may be directly covered with an asphalt-cement surface later.

The stabilizing combination may be used to stabilize the soil for bike and recreational paths, without a negative impact on the environment.

Soil stabilization using the stabilizing composition allows to carry out runways and parking spaces for flying equipment.

After stabilization, stable ground surface is still environmentally friendly and safe to use due to the values of the material formed as a result of mixing the soil with cement (or volatile ashes) and a stabilizing composition.

We claim:

1. A composition for stabilizing clay-loam soils in liquid form, comprising:
    at least one multifunctional organic compound comprised of derivatives of one of group consisting of aromatic compounds, heterocyclic compounds, and alicyclic compounds, in an amount of 20-40% by weight;
    at least one acidic surfactant in an amount of 2-10% by weight;
    at least one trivalent metal compound in an amount of 1.0-2.5% by weight; and
    sulphuric acid, in an amount of up to 100% by weight,
    wherein said at least one multifunctional organic compound comprises at least two acidic and donor functional groups or functional groups having reactivity with soil colloids with at least van der Waals forces so as to form hydrogen bonds.

2. The composition according to claim 1, further comprising: multifunctional aliphatic organic compounds comprising oxygen groups in an amount of 2-8% by weight, wherein said aliphatic organic compounds are selected from a group consisting of: aliphatic dicarboxylic acids and hydroxy acids.

3. The composition according to claim 2, wherein said oxygen groups are selected from at least one of a group consisting of oxalic acid, malonic acid, succinic acid, tartaric acid and citric acid.

4. The composition according to claim 1, wherein said at least one trivalent metal compound is comprised of salts comprising ions of at least one of a group consisting of trivalent iron (Fe+3) and trivalent aluminium (Al+3), said salts being in a form of at least one of a group consisting of sulphates, carbonates, oxides, and hydroxides.

5. The composition according to claim 1, wherein said sulphuric acid is comprised of 65% to 96% of at least one of a group consisting of sulphuric acid, oleum and SO3.

6. A composition for stabilizing clay-loam soils in liquid form, comprising:
- at least one multifunctional organic compound comprised of derivatives of one of group consisting of aromatic compounds, heterocyclic compounds, and alicyclic compounds, in an amount of 20-40% by weight;
- at least one acidic surfactant in an amount of 2-10% by weight;
- at least one trivalent metal compound in an amount of 1.0-2.5% by weight; and
- sulphuric acid, in an amount of up to 100% by weight,
- wherein said at least one multifunctional organic compounds is selected from at least one of a group consisting of: 1-naphthol-2,4,9-trisulphonic acid, 2-sulpho-terephthalic acid, anthraquinone-2,4-disulphonic acid, 5-sulphosalicylic acid, and 2-naphthol-4-nitro-6-sulphonic acid.

7. The composition according to claim 6, wherein said at least one multifunctional organic compound comprises at least two acidic and donor functional groups or functional groups having reactivity with soil colloids with at least van der Waals forces so as to form hydrogen bonds.

8. The composition according to claim 7, wherein said at least one multifunctional organic compound comprises at least one sulphonic group and at least one group selected from: phenolic groups, thiolic groups, carboxylic groups, -thiocarboxylic groups, ester (—COOR) amides, alcohol (—OH) amides, a primary (—CONH2) amide, secondary (—CONHR) amides, nitrosilic (—NO) groups, nitric (—NO2) groups, ketone (C=O) groups, quinone (—CO) groups, primary amines (—NHR), secondary amines, and tertiary amines (—NR3).

9. A composition for stabilizing clay-loam soils in liquid form, comprising:
- at least one multifunctional organic compound comprised of derivatives of one of group consisting of aromatic compounds, heterocyclic compounds, and alicyclic compounds, in an amount of 20-40% by weight;
- at least one acidic surfactant in an amount of 2-10% by weight;
- at least one trivalent metal compound in an amount of 1.0-2.5% by weight; and
- sulphuric acid, in an amount of up to 100% by weight,
- wherein said at least one acidic surfactant is comprised of 4-dodecylbenzenesulphonic acid (ABS).

* * * * *